United States Patent [19]

Walin

[11] 4,295,975
[45] Oct. 20, 1981

[54] OIL COLLECTING METHOD

[76] Inventor: Gösta Walin, L. Montörsgatan 3, Västra Frölunda, Sweden, S-421 68

[21] Appl. No.: 116,647

[22] Filed: Jan. 29, 1980

Related U.S. Application Data

[62] Division of Ser. No. 898,079, Apr. 20, 1978, Pat. No. 4,186,095.

[30] Foreign Application Priority Data

Apr. 27, 1977 [SE] Sweden .............................. 7704814

[51] Int. Cl.³ ............................................ E02B 15/04
[52] U.S. Cl. .................................. 210/800; 210/923; 210/242.1
[58] Field of Search ................ 210/83, 242, DIG. 25, 210/512, 800, 923

[56] References Cited

U.S. PATENT DOCUMENTS

| | | | |
|---|---|---|---|
| 2,422,464 | 6/1947 | Bertholomew | 210/512 R |
| 3,800,951 | 4/1974 | Mourlon et al. | 210/242 |
| 4,186,095 | 1/1980 | Walin | 210/242 S |

Primary Examiner—Theodore A. Granger
Attorney, Agent, or Firm—Schuyler, Banner, Birch, McKie & Beckett

[57] ABSTRACT

Method for collecting pollution, especially oil, from a surface contaminated liquid. An oil collecting apparatus is adapted to float on the surface of the liquid. A surface layer of liquid with pollutant is drawn into a rotating hollow rotor by virtue of a liquid vortex established therein. The incoming liquid contacts the overlying surface of a concentrically arranged stator. This contact reduces the rotational velocity of the boundary layer of liquid containing the pollutant. The resultant force urges the pollutant toward the center of the vortex, when it is drawn off through a collecting cavity located centrally of the stator.

8 Claims, 3 Drawing Figures

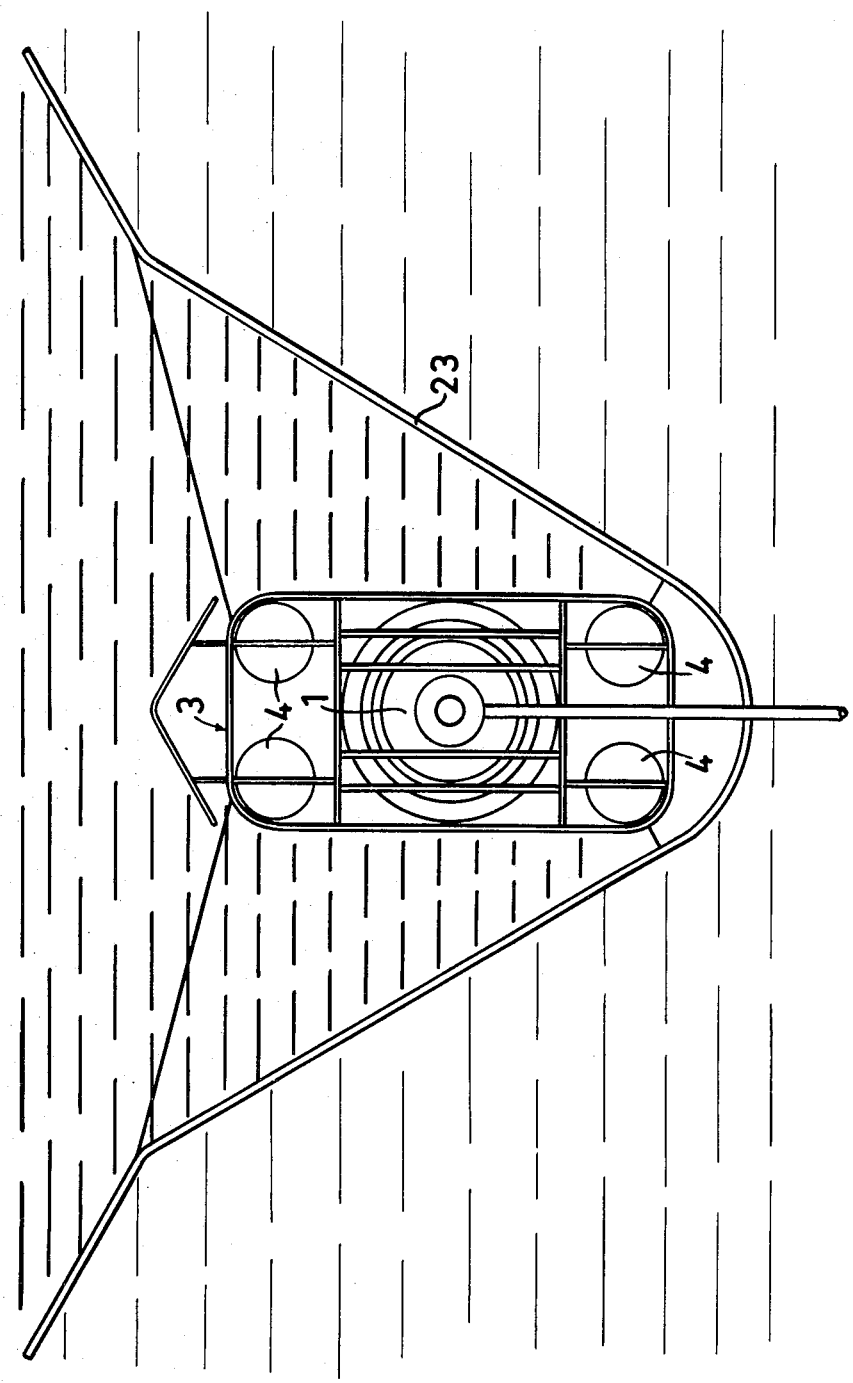

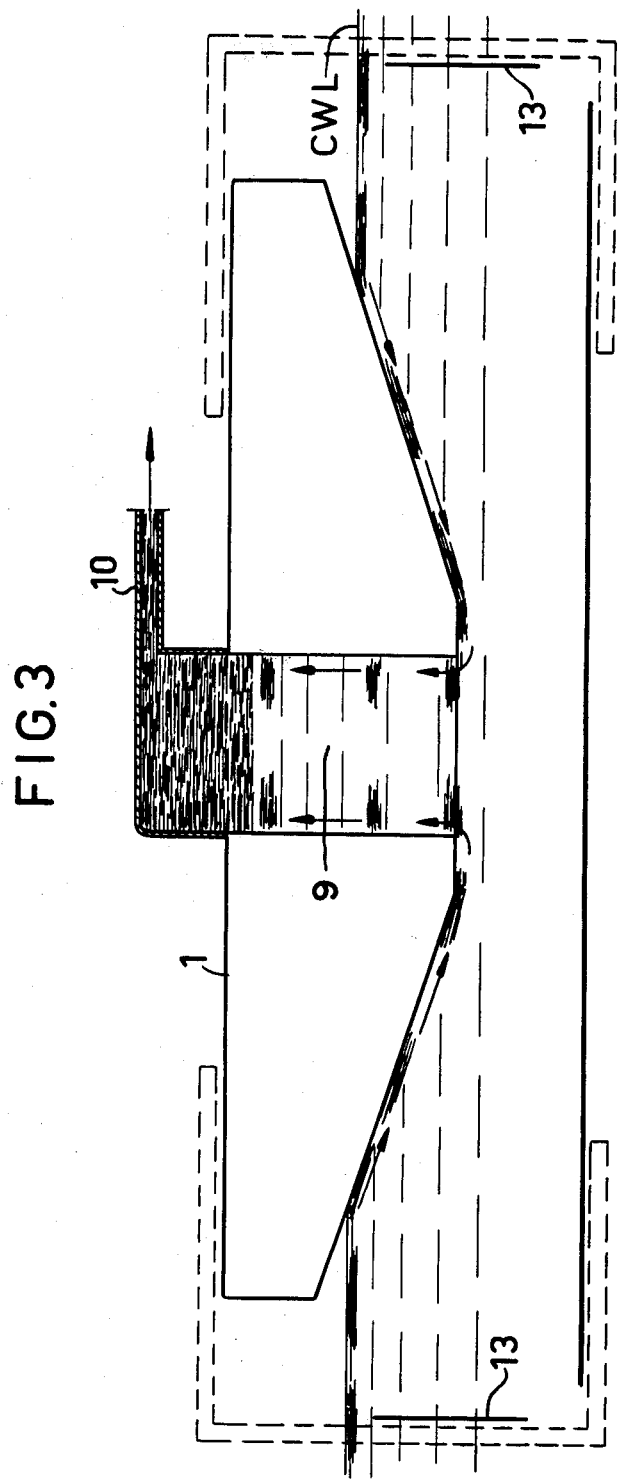

OIL COLLECTING METHOD

This is a division, of application Ser. No. 898,079, filed Apr. 20, 1978 now U.S. Pat. No. 4,186,095.

The present invention relates to methods for collecting pollution, especially oil, from a surface contaminated liquid.

There is an increasing demand for means capable of removing pollution from surface contaminated liquids. Particularly, oil discharges into seas, rivers and lakes are serious environmental problems. To prevent such oil from spreading over a vast area of the water surface it may be encircled by floating barriers defining an area in which there commonly is a relatively thin layer of oil floating on the water surface. It is difficult to remove this thin oil layer without simultaneously removing a considerable amount of water.

In the Swiss Patent specification No. 510 792 there is suggested an arrangement in which a vortex is formed in surface contaminated water. Oil flows into the cavity formed in the centre of the vortex, where there is accumulated a volume of oil which is sufficiently large to be removed without simultaneously removing any substantial amount of water. However, this arrangement has certain drawbacks. Thus, for example, the shape and position of the accumulated oil volume varies with the heave of the sea, whereby the removing of oil is less efficient.

An apparatus according to the invention includes a submerged rotationally symmetrical vortex chamber with inlet and outlet for the liquid, means for bringing liquid within the vortex chamber into a horizontally rotating vortex movement, and a pollution outlet tube arranged above the vortex chamber. According to the invention the efficiency is considerably improved in that a rotationally symmetrical stator is arranged at the level of the liquid surface, the stator having a collecting cavity which opens downwards in a central part of the stator, said pollution outlet tube being connected to the collecting cavity. The stator has a lower end surface which slopes downwards and inwards through the liquid surface to the opening of the collecting cavity, the stator being arranged in a concentric manner with respect to the vortex chamber. The vortex chamber may comprise the interior of a hollow rotor having an upper threshold inlet. The invention includes a method of separating oil from water using an apparatus of this type.

The invention is further described below with references to the drawings, in which:

FIG. 2 is a top view of the arrangement of FIG. 1 cooperating with floating oil barriers; and FIG. 3 is a schematical side view, in section, with reference to which the operative function of the stator is explained below.

Figure 1:
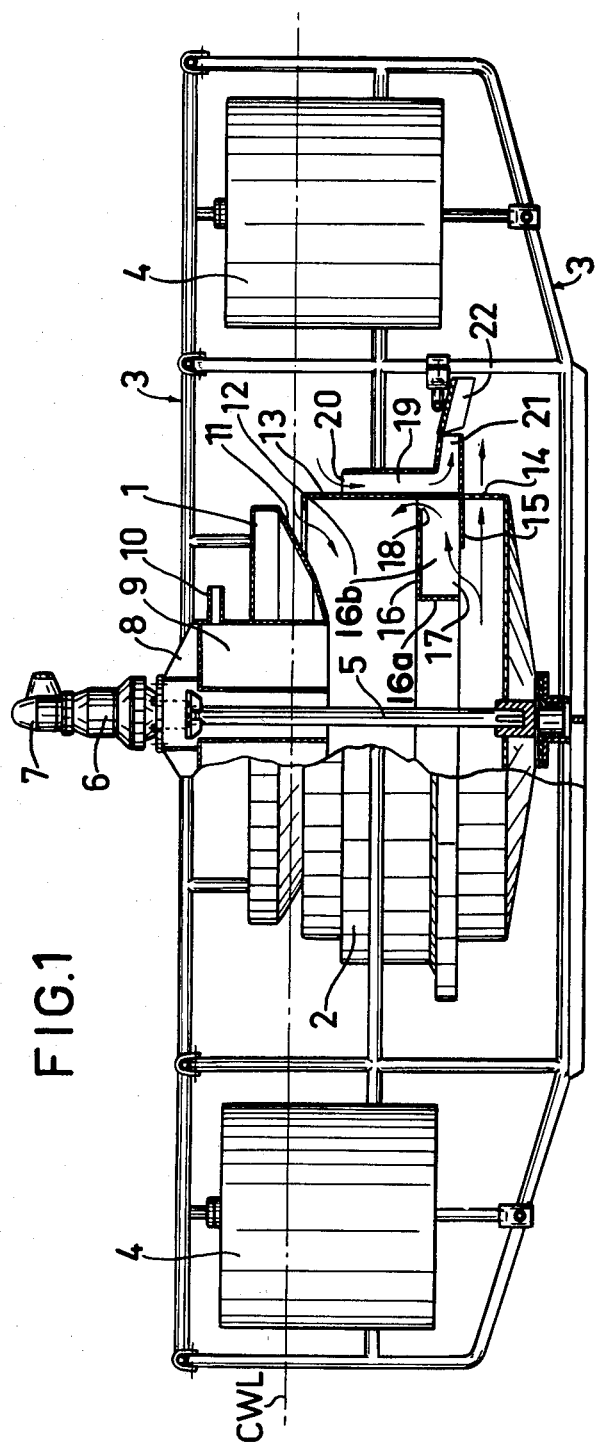
FIG. 1 is a side view, partly in section, of an embodiment of the invention.

In FIG. 1 there is shown an apparatus for collecting oil from oil discharges at sea. The apparatus includes a rotationally symmetrical stator and a rotor 2. The stator 1 is rigidly connected to a framework 3 which includes float bodies 4 being arranged in such a manner that the apparatus floats steadily in a correct floating position. The rotor 2 is mounted on a shaft 5, which is driven by a motor 7 through a gear box 6. The motor 7 and the gearbox 6 are rigidly connected to the framework 3 through a shield 8.

In the central part of the stator 1 there is provided a collecting cavity 9, which is open downwards and has an outlet tube 10 in its upper part. The lower end surface 11 of the stator 1 slopes downwards and inwards through the water surface and partly into the interior of rotor 2 to the opening of the collecting cavity 9.

The rotor 2 confines a vortex chamber 12 and is open upwards. It has a cylindrical side wall 13 terminating somewhat below the water surface level CWL. Thus, the surface layer including the oil floating on the water is free to enter the vortex chamber 12 through the threshold inlet formed by the upper edge of cylindrical side wall 13. In a lower part of the cylindrical side wall 13 and around its periphery there is provided an outlet comprising a plurality of outlet openings 14. Above the outlet openings 14 annular plates 15 and 16 are arranged around the periphery of the side wall 16. Between the plates 15 and 16 an inner plate 16a and a plurality of radial vanes 16b are provided whereby a multi-chambered inner radial pump is formed having inlets 17 and an outlets 18. An outer multichambered radial pump 19 with inlet 20 and outlet 21 is formed on the outside of the cylindrical side wall around its periphery. Outside the outlet 21 guide vanes 22 are mounted on the framework 3.

The method of operation of the apparatus is described below with reference also to the schematical view in FIG. 3 for explaining the operative function of the stator 1. It is presumed that the apparatus is operating in a water area which has been polluted by oil, which is prevented from spreading by means of floating oil barriers 23 (FIG. 2). The apparatus is floating in such a manner that the water surface level CWL is above the upper edge of the cylindrical side wall 13 permitting the surface layer to enter the vortex chamber 12.

The motor 7 brings the rotor 2 to rotate. Thus, a vortex is established in the vortex chamber 12, i.e. liquid in the chamber is rotating around the shaft 5. It is essential that the liquid rotates properly in the volume below the lower end surface 11 of the stator 1. In a cylindrical liquid volume below the collecting chamber 9 rotation is not important. In the layer immediately adjacent to the lower end surface 11 of the stator 1 there occurs a so-called boundary layer phenomenon due to the fact that the particles in this layer are retarded by friction against the stator 1, whereby their rotational velocity is reduced. For particles in the boundary layer the horizontal pressure gradient force acting towards the centre of rotation is thus larger than the centrifugal force acting in the oppsite direction. Due to this excess pressure force these particles move inwards along the lower end surface 11 of the stator in towards the collecting cavity 9. Such boundary layer flux is well known in the art of hydrodynamics.

As oil is floating on the water surface, oil will be present in the boundary layer adjacent to the stator 1. Thus, oil is transported within this boundary layer into the collecting chamber 9, wherefrom it is pumped away through the outlet tube 10 by a pump (not shown) to suitable subsequent treatment.

The water floating out through the pump outlet 18 has a rotary movement around the shaft 5. The object of that water flow is to support the rotation motion of the liquid in the vortex chamber 12. Excess water leaves the vortex chamber through the outlet openings 14.

The purpose of the outer radial pump 19 is to provide a flow of water in towards the apparatus in a water layer adjacent to and below the polluted surface layer.

This water flow is comparatively strong and interacts with the polluted surface layer in such a manner that oil flows with increased velocity in towards the apparatus from a comparatively large area around the apparatus. Thus, the inlet 20 of the pump 19 is situated on such a level below the water surface that oil from the surface layer will not be sucked into the pump. The flow of water from the pump outlet 21 is directed radially outwards and downwards below the float bodies 4 by means of the guide vanes 22.

What I claim is:

1. A method of separating and collecting oil floating on the surface of a body of oil-polluted water comprising the steps of:

fixedly positioning a stator on the water, said stator being substantially symmetrical about a generally vertical axis and having a downwardly opening central oil-collecting cavity, and a lower oil-contacting and diverting surface which slopes downwardly and inwardly from the periphery of said stator through the surface of the water to the submerged opening of said cavity;

rotating a submerged hollow rotor about said vertical axis directly beneath said stator, the rotor having a sidewall defining therewithin a rotor interior, the interior of said rotor communicating with the surrounding body of water through an upper inlet near the surface of the water which surrounds the lower surface of said stator, and a lower outlet spaced below said inlet in the lower portion of said rotor, said rotation establishing a vortex of liquid in the interior of said rotor which draws a surface layer of oil and water into the upper portion of said rotor through said outlet, and causes the rotating oil to contact the lower surface of said stator to be slowed thereby and diverted inward to said oil-collecting cavity.

2. A method according to claim 1 further comprising the step of recirculating a portion of the water flowing toward said rotor outlet back upwardly toward said rotor inlet to support the liquid vortex.

3. A method according to claim 2 wherein said recirculation step is performed by vaned inner pump means in said rotor interior.

4. A method according to claim 3 wherein said rotor has a sidewall and said vaned inner pump means comprises a plurality of annularly arranged pumping chambers defined by spaced annular upper and lower plates attached to said sidewall above said outlets, an inner plate joined to the inner edges of said upper and lower plates, and a plurality of upstanding annularly spaced radial vanes dividing the annular space between said sidewall and said plates into chambers having an outlet in said upper plate adjacent to said sidewall and an inlet in said lower plate adjacent to said inner plate.

5. A method according to claim 1 further comprising the step of removing oil from said oil-collecting cavity.

6. A method according to claim 1 further comprising the step of augmenting the flow of pollution into said rotor inlet with vaned outer pump means attached to the exterior of said rotor.

7. A method according to claim 6 wherein said rotor has a sidewall and said outer pump means comprises a plurality of annularly arranged pumping chambers attached to the exterior of said sidewall and having an axially directed inlet located below said rotor inlet and and outwardly directed outlet located below said axially directed inlet.

8. A method of separating and collecting oil floating on the surface of a body of oil-polluted water comprising the steps of:

fixedly positioning a stator on the water, said stator being substantially symmetrical about a generally vertical axis and having a downwardly opening central oil-collecting cavity, and a lower oil-contacting and diverting surface which slopes downwardly and inwardly from the periphery of said stator through the surface of the water to the submerged opening of said cavity;

rotating a submerged hollow rotor about said vertical axis directly beneath said stator, said rotor having a sidewall, a rotor inlet near the surface of the water which surrounds the lower surface of said stator, a lower rotor outlet, and vaned inner pump means comprising a plurality of annularly arranged pumping chambers defined by spaced annular upper and lower plates attached to said sidewall above said outlet, an inner plate joined to the inner edges of said upper and lower plates, and a plurality of upstanding annularly spaced radial vanes dividing the annular spaces between said sidewall and said plates into chambers having a chamber outlet in said upper plate adjacent to said sidewall and a chamber inlet in said lower plate adjacent to said inner plate, said rotation establishing a vortex of liquid in the interior of said rotor which draws a surface layer of oil and water into said rotor through said inlet, discharges water through said outlet, recirculates a portion of the water flowing toward said rotor outlet back upwardly through said vaned inner pump means toward said rotor inlet to support the liquid vortex, and causes the rotating oil to contact the lower surface of said stator to be slowed thereby and diverted inward to said oil-collecting cavity.

* * * * *